Patented Oct. 9, 1923.

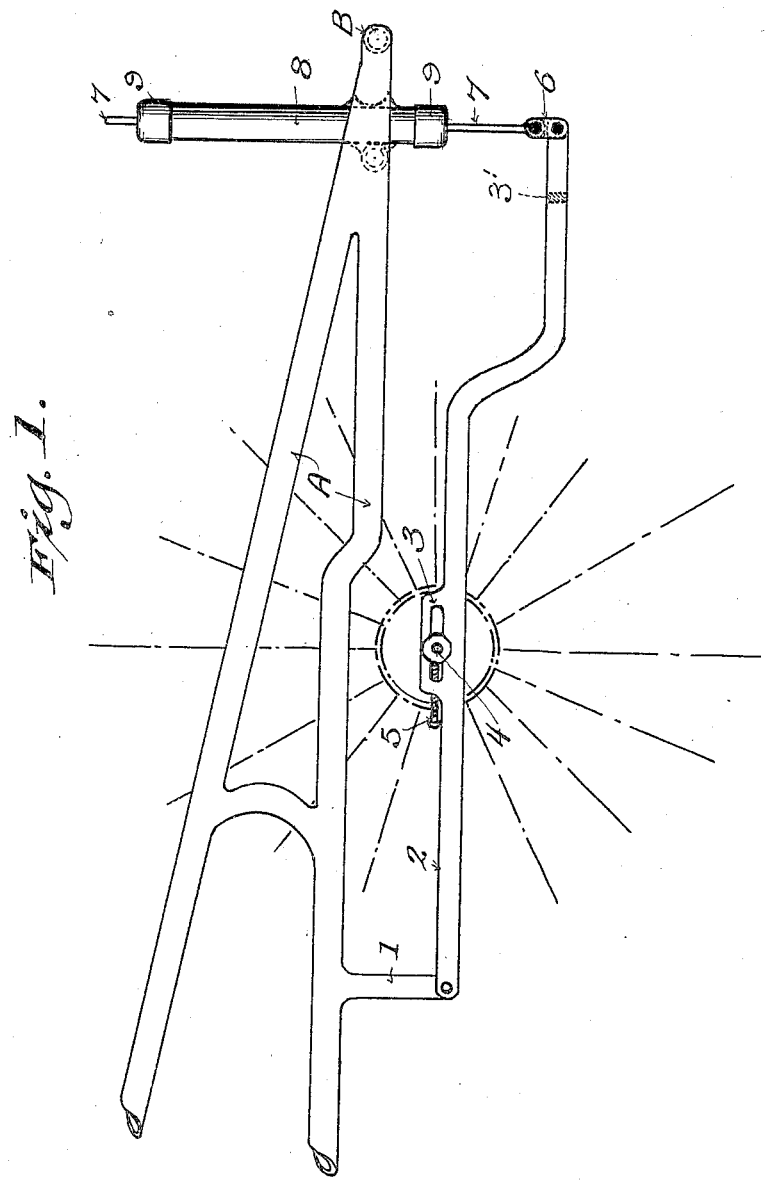

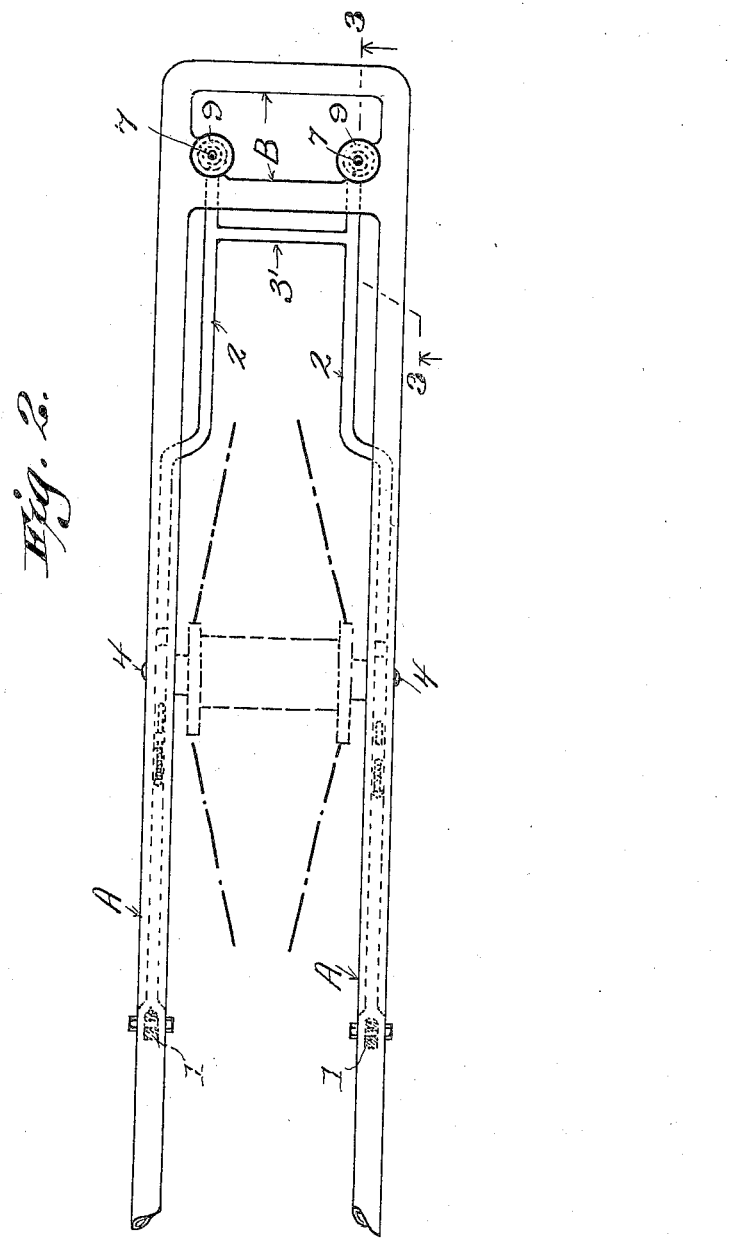

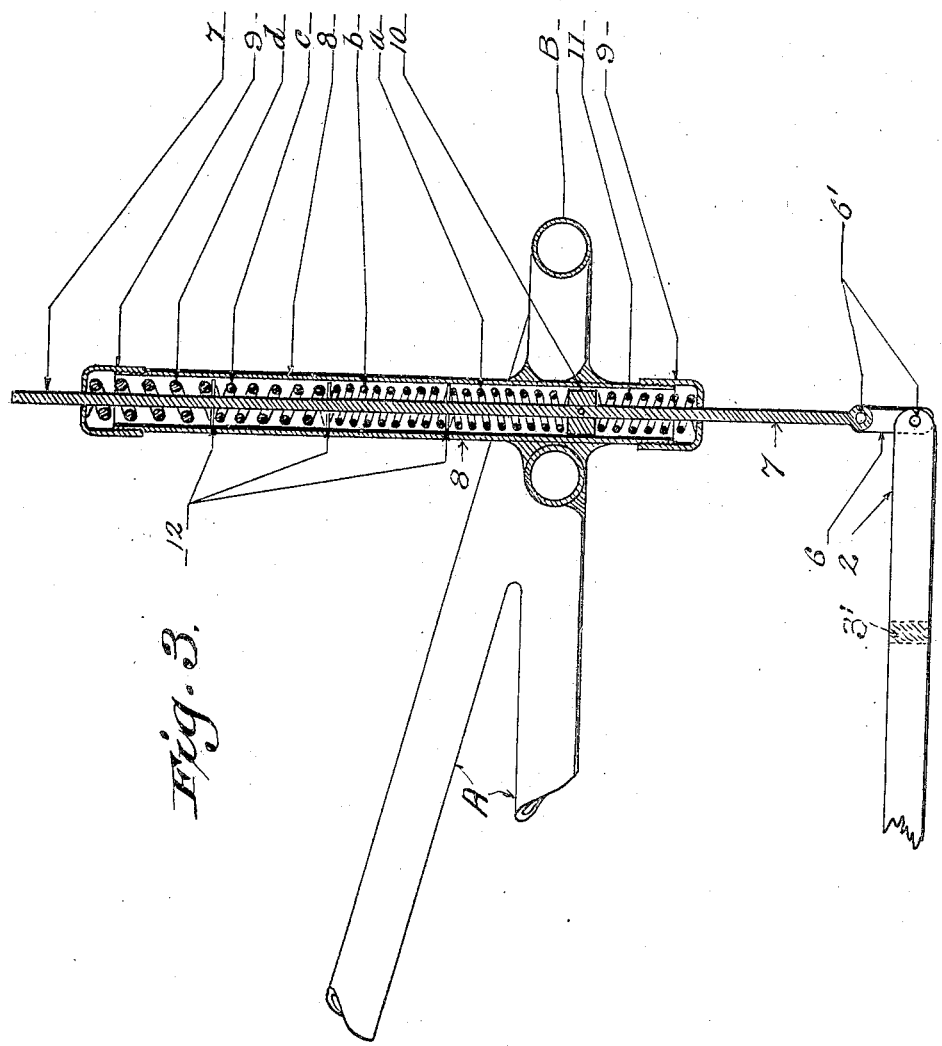

1,470,301

UNITED STATES PATENT OFFICE.

ARTHUR G. TAPPEN AND AXEL V. WALLENTINE, OF MADISON, WISCONSIN.

SHOCK ABSORBER.

Application filed October 31, 1921. Serial No. 511,621.

*To all whom it may concern:*

Be it known that we, ARTHUR G. TAPPEN and AXEL V. WALLENTINE, both citizens of the United States, and residents of Madison, in the county of Dane and State of Wisconsin, have invented certain new and useful Improvements in Shock Absorbers; and we do hereby declare that the following is a full, clear, and exact description thereof.

Our invention refers to shock absorbers for vehicles, and it has for its primary object to provide a shock absorber having relatively reciprocative wheel supported frame members carrying a series of super-imposed coil springs differing in degrees of strength, whereby such spring units may be interchangeable and variable as to strength to compensate for variations in the load carried by the vehicle.

A further object of the invention is to provide, in connection with the super-imposed series of springs, a recoil spring, whereby the load shock upon the vehicle is absorbed and the rebound also.

Specific objects of our invention are,

To provide a vehicle frame, having a wheel carrying lever or set of levers in pivotal union with the frame, the lever and frame being connected by relatively reciprocative spring connecting members, having a partition there-between, whereby an upper and lower compartment is had, the upper compartment being provided with a series of independent spring units, varying in strength, and the lower compartment with a single unit to thus absorb shock in both directions and to vary the load resistance strain by substituting spring units in the upper compartment of different degrees of load resistance tension.

Another object of our invention is to provide wheel carrying levers in connection with the frame having plunger rods in telescopic union with a housing fixed on the frame, the plunger rods carrying spring supports, whereby the housing is divided into upper and lower compartments for the reception of independent spring units varying in load strength, it being understood that a multiple series of units is provided for resisting the load strain and one or more of the units for resisting the recoil.

With the above objects in view, the invention consists in certain peculiarities of construction and combination of parts, as are hereinafter fully set forth with reference to the accompanying illustrations and subsequently claimed.

In the drawings,

Figure 1 represents a rear portion of the frame of a motor-cycle in side elevation having attached thereto a shock absorber mechanism exemplifying our invention, the same being shown with a fragment of the driving wheel, indicated in dotted lines.

Figure 2, a plan view of the same, and

Figure 3, an enlarged detailed side elevation with parts broken away and in section, as indicated by line 3—3 of Figure 2.

Referring by characters to the drawings, A—A represent the parallel side bars of a motor-cycle frame, which bars are joined at their rear ends by parallel struts B, the side bars and struts constituting, in effect, a rigid rear wheel fork for a motor-cycle. Obviously this fork may be in the form of an attachment to a standard type of motor-cycle or the device, to be hereinafter described, may be applied directly to a motor-cycle frame especially designed for the purpose of receiving an equipment in accordance with our invention.

It should also be understood that while we have, as an exemplification of our invention, shown it as an attachment to a motor-cycle or bicycle, obviously the invention will be just as applicable to a four-wheel vehicle, either of the motor driven type or otherwise.

The lower bar of the skeleton frame unit has extending, therefrom, an ear 1 to which ear is pivoted one end of a lever 2, a pair of such levers, in this exemplification of our invention, being connected by a cross bar 3' at their rear ends, whereby the structure, as a whole, constitutes a floating fork. The central portions of the connected levers 2 are formed with longitudinally apertured webs 3, the apertures thereof being provided for the reception of an axle 4 which is suitably secured within the slots and, in this case, arranged to be adjusted back and forth by a pair of set screws 5 that are in threaded union with the webs, the same constituting any standard type of belt or chain tightener for the axle. The axle, as shown, has mounted thereon the hub of a drive wheel, as indicated by dotted lines in Figures 1 and 2 of the drawings.

The rear ends of the floating levers 2—2 carry links 6, which links are pivotally connected at 6' to plunger rods 7. Each plunger rod is in telescopic engagement with a housing 8, the same being brazed or otherwise secured to the rear ends of the frame members A and one of the struts B. Each housing is in tubular form having its ends threaded for the reception of centrally apertured caps 9, which caps serve as guides for its associated plunger rod 7, it being understood that the housings and plunger rods are relatively reciprocative and that they together constitute means for supporting shock absorber springs.

The plunger member 7, in this particular exemplification of our invention has secured thereto, a collar constituting a spring support 10, the same being positioned relatively near the bottom cap 9 of the housing. Hence it will be seen that the collar or spring support constitutes a partition, whereby the relatively reciprocative spring carrying members are divided into upper and lower compartments.

The lower compartment has mounted therein, a shock receiving coil spring unit 11, the same being interposed between the collar 10 and cap 9.

The upper compartment has nested therein, a series of coil spring units $a$, $b$, $c$ and $d$, the same being of progressively greater strength, as shown in Figure 3. These superimposed coil spring units are positioned about the plunger rod member 7, and the lowermost one $a$, rests upon the collar 10. Each of the spring units is separated from its companion unit by a washer 12.

From the foregoing description it will be observed that the tension of recoil spring 11 can be varied a predetermined degree by adjusting the lower cap 9 with relation to the housing 8 and the upper, or load, resisting series of spring units can be tensioned by adjustment of the upper cap 9 with relation to said housing. Obviously load upon the frame A will be resisted more or less by the series of springs, $a$ to $d$ respectively, and the road shock or recoil will be absorbed by the spring unit 11.

Owing to the fact that the series of load resisting springs can be removed and others of different strength substituted therefor, the shock absorber, as a whole, can be varied to a delicate degree in proportion to the load, whereby the vehicle will run smoothly and thus eliminate the extreme vibration and its consequent damage to riders under ordinary road conditions, this vibration and shock being especially noticeable in road use of vehicles. Attempts have been made to absorb vibration and shock in motor-cycles or other vehicles. Springs of various kinds have been utilized but in such structures no provision was made for predeterminedly varying the strength of a series of springs in proportion to the load. For example, in instances where a load usually carried is light, a set of comparatively light spring units are dropped into the housing and under reverse conditions comparatively heavy springs are substituted for those of lighter or more delicate tension.

It is also our intention to provide the recoil spring units in various strengths, whereby they can be interchanged under certain conditions.

It will be noted that, in addition to the fact that the shock absorber device will not only relieve strain upon the rider, which strain has proved injurious to health, but it will also relieve strain upon the various parts of the machine or vehicle to which it is applied, whereby the life of the vehicle will be materially extended, due to the fact that vibration is reduced upon the metal parts and crystallization or breakage of them is thus avoided.

While we have shown one simple exemplification of our invention minutely as to detail, it is understood that we may vary the structural features of it within the scope of the claims as they will be hereinafter interpreted by those skilled in the art.

We claim:

1. The combination with a wheel supported vehicle having a frame, of a floating lever pivoted directly thereto, a wheel carried by the lever, a housing carried by the frame, a plunger rod reciprocatively mounted in the housing, a link pivoted to said lever and said rod, a collar secured to the plunger rod, a recoil spring interposed between one face of the collar and one end of the housing, and a series of coil springs interposed between the other face of the collar and opposite end of said housing, the series of coil springs being interchangeable with another series whereby variation in their combined load resisting strength may be had.

2. The combination of a frame, a lever pivoted directly thereto at one end, a second lever pivoted directly thereto at one end, said second lever being similar to and parallel to said first mentioned lever, a wheel rotatably supported between said levers, a cross bar rigidly securing said first mentioned lever to said second mentioned lever, a pair of housings carried by said frame, a plunger rod reciprocatively mounted in each of said housings, a collar secured to each of said plunger rods, a recoil spring interposed between one face of the collar and one end of the housing, a series of coil springs interposed between the other end of the collar and the opposite end of said housing, and a pair of links, each of said links being pivoted to the lower end of one of said plunger rods, and to one of said levers.

In testimony that we claim the foregoing we have hereunto set our hands at Madison, in the county of Dane and State of Wisconsin.

ARTHUR G. TAPPEN.
AXEL. V. WALLENTINE.